(12) United States Patent
Obradovic et al.

(10) Patent No.: US 11,574,193 B2
(45) Date of Patent: Feb. 7, 2023

(54) METHOD AND SYSTEM FOR TRAINING OF NEURAL NETWORKS USING CONTINUOUSLY DIFFERENTIABLE MODELS

(71) Applicant: Samsung Electronics Co., LTD., Gyeonggi-do (KR)

(72) Inventors: Borna J. Obradovic, Leander, TX (US); Titash Rakshit, Austin, TX (US); Jorge A. Kittl, Austin, TX (US); Ryan M. Hatcher, Austin, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1056 days.

(21) Appl. No.: 16/122,789

(22) Filed: Sep. 5, 2018

(65) Prior Publication Data
US 2019/0332943 A1     Oct. 31, 2019

Related U.S. Application Data

(60) Provisional application No. 62/664,142, filed on Apr. 28, 2018, provisional application No. 62/664,102, filed on Apr. 28, 2018.

(51) Int. Cl.
*G06N 3/08* (2006.01)
*G06N 5/04* (2006.01)
*G06N 3/04* (2006.01)

(52) U.S. Cl.
CPC ........... *G06N 3/084* (2013.01); *G06N 3/0481* (2013.01); *G06N 3/082* (2013.01); *G06N 5/04* (2013.01)

(58) Field of Classification Search
CPC ...... G06N 3/0481; G06N 3/084; G06N 3/082; G06N 5/04
See application file for complete search history.

(56) References Cited

U.S. PATENT DOCUMENTS

| 5,052,043 A * | 9/1991 | Gaborski | ............... G06N 3/084 706/20 |
|---|---|---|---|
| 9,508,347 B2 | 11/2016 | Wang | |

(Continued)

FOREIGN PATENT DOCUMENTS

| CN | 107798388 A | 3/2018 |
|---|---|---|
| TW | 201737202 A | 10/2017 |
| TW | 201812646 A | 4/2018 |

OTHER PUBLICATIONS

Reagen et al. (Minerva: Enabling Low-Power, Highly-Accurate Deep Neural Network Accelerators, Jun. 2016, pp. 267-278) (Year: 2016).*

(Continued)

*Primary Examiner* — George Giroux
(74) *Attorney, Agent, or Firm* — Lewis Roca Rothgerber Christie LLP

(57) ABSTRACT

A method and system for training a neural network are described. The method includes providing at least one continuously differentiable model of the neural network. The at least one continuously differentiable model is specific to hardware of the neural network. The method also includes iteratively training the neural network using the at least one continuously differentiable model to provide at least one output for the neural network. Each iteration uses at least one output of a previous iteration and a current continuously differentiable model of the at least one continuously differentiable model.

18 Claims, 4 Drawing Sheets

(56) References Cited

U.S. PATENT DOCUMENTS

| | | | |
|---|---|---|---|
| 9,785,886 B1* | 10/2017 | Andoni | G06N 3/04 |
| 10,592,732 B1* | 3/2020 | Sather | G06N 3/0481 |
| 10,777,306 B1* | 9/2020 | LaBorde | G06N 3/088 |
| 11,043,205 B1* | 6/2021 | Su | G10L 15/1815 |
| 2013/0041859 A1* | 2/2013 | Esterlilne | G06N 3/02 |
| | | | 706/25 |
| 2016/0379112 A1 | 12/2016 | He | |
| 2017/0205813 A1* | 7/2017 | Sayyarrodsari | G06F 8/30 |
| 2017/0308789 A1 | 10/2017 | Langford | |
| 2017/0323199 A1 | 11/2017 | Wu | |
| 2018/0018590 A1 | 1/2018 | Szeto et al. | |
| 2018/0114117 A1 | 4/2018 | Lin | |
| 2018/0121796 A1* | 5/2018 | Deisher | G06N 3/0472 |
| 2018/0314938 A1* | 11/2018 | Andoni | G06N 3/086 |
| 2019/0114824 A1* | 4/2019 | Martinez | G06T 7/50 |

OTHER PUBLICATIONS

Kamyshanksa et al. (The Potential Energy of an Autoencoder, Oct. 2014, pp. 1261-1273) (Year: 2014).*

Njikam et al. (A novel activation for multilayer feed-forward neural networks, Jan. 2016, pp. 75-82) (Year: 2016).*

Grelsson et al. (Improved Learning in Convolutional Neural Networks with Shifted Exponential Linear Units (ShELUs), Aug. 2018, pp. 517-522) (Year: 2018).*

Chung et al. (Deep Neural Network Using Trainable Activation Functions, Jul. 2016, pp. 348-352) (Year: 2016).*

Özbay et al. (A new method for classification of ECG arrhythmias using neural network with adaptive activation function, Jul. 2010, pp. 1040-1049) (Year: 2010).*

Deng et al., GXNOR-Net: Remove Full-Precision Memory for Training Deep Neural Networks with Ternary Weights and Activations under a Unified Discretization Framework, Apr. 9, 2018.

Li et al., Ternary Weight Networks, Nov. 19, 2016.

Rastegari et al., XNOR-Net: ImageNet Classification Using Binary Convolutional Neural Networks, Aug. 2, 2016.

Tang et al., How to Train a Compact Binary Neural Network with High Accuracy, Proceedings of the Thirty-First AAAI Conference on Artificial Intelligence (AAAI-17), 2017.

Zhou et al., DoReFe-Net: Training Low Bitwidth Convolutional Neural Networks with Low Bitwidth Gradients, Feb. 2, 2018.

Reagen, Brandon, et al., "Minerva: Enabling Low-Power, Highly-Accurate Deep Neural Network Accelerators," ACM SIGARCH Computer Architecture News, 2016, 13 pages.

Taiwanese Office Action dated Jul. 8, 2022, issued in corresponding Taiwanese Patent Application No. 108108359 (7 pages).

* cited by examiner

METHOD AND SYSTEM FOR TRAINING OF NEURAL NETWORKS USING CONTINUOUSLY DIFFERENTIABLE MODELS

CROSS-REFERENCE TO RELATED APPLICATIONS

This application claims the benefit of provisional Patent Application Ser. No. 62/664,142, filed Apr. 28, 2018, entitled "A HARDWARE-AWARE ALGORITHM FOR OFF-LINE TRAINING OF NEURAL NETS", and provisional Patent Application Ser. No. 62/664,102, filed Apr. 28, 2018, entitled "A HARDWARE-AWARE ALGORITHM FOR OFF-LINE TRAINING OF NEURAL NETS" assigned to the assignee of the present application, and incorporated herein by reference.

BACKGROUND

Applications involving Deep-Learning Neural Networks (NNs) or neuromorphic computing such as image recognition, natural language processing and more generally various pattern-matching or classification tasks are quickly becoming as important as general-purpose computing. The essential computational element of the NN, or neuron, includes multiple inputs and an output. Associated with each input is a number, or weight. The activation of the neuron is computed by performing a weighted sum of the inputs (using the weights), which is then processed by the activation function. The activation function is typically a thresholding function. Thus, the neuron generally performs a vector-matrix product, or multiply-accumulate (MAC) operation, which is then thresholded.

The weights defined by the mathematical description of a NN are real numbers, and thus continuous. However, many hardware implementations of NNs use or propose to use lower-precision, discrete approximations to the real values for the weights. For example, some recent NNs are XNOR or gated XNOR (GXNOR) networks that would use only two (binary) or three (ternary) discrete levels. Such NNs may use $-1$ and $1$ (binary), or $-1$, $0$, and $1$ (ternary) weights. Other hardware implementations might use a different number of discrete weights. While such reduced-precision weights are attractive from a hardware perspective, there is a potential penalty in the achievable inference accuracy. This is particularly true in the case of off-chip training, in which training is performed on a different system than is actually used for inference.

The degree of loss in inference accuracy depends on the details of the weights and on the training algorithm used. The straightforward approach to quantization is to simply perform standard training using floating-point weights off-line, and then choose discrete "bins" into which the mathematical weights are placed. A refinement of this algorithm treats the size of the bins as a hyperparameter, to be optimized on validation data for best accuracy. However, even with this refinement, NNs using lower-precision weights may suffer appreciable inference accuracy losses.

What is desired is improved inference accuracy for NNs that use lower precision weights even if such NNs are trained offline.

DETAILED DESCRIPTION OF THE INVENTION

Figure 1:
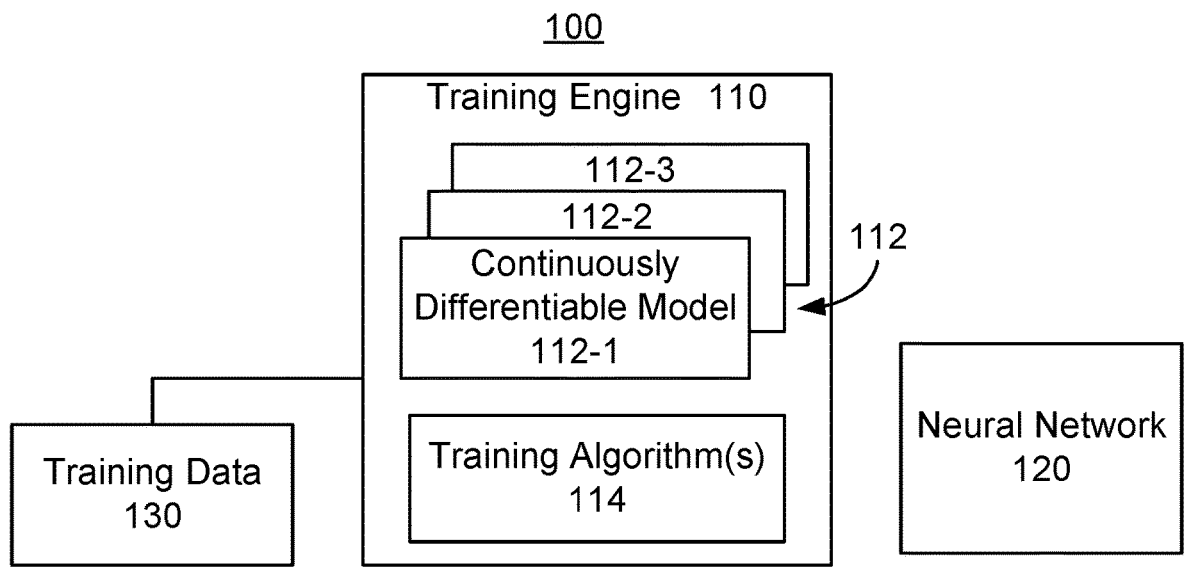
FIG. 1 is a block diagram depicting an exemplary embodiment of a system for training a neural network using a continuously differentiable model.

The exemplary embodiments relate to training neural networks and that may be employed in a variety of fields including but not limited to machine learning, artificial intelligence, neuromorphic computing and neural networks. The method and system may be extended to other applications in which logic devices are used. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations.

Phrases such as "exemplary embodiment", "one embodiment" and "another embodiment" may refer to the same or different embodiments as well as to multiple embodiments. The embodiments will be described with respect to systems and/or devices having certain components. However, the systems and/or devices may include more or fewer components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

A method and system for training a neural network are described. The method includes providing at least one continuously differentiable model of the neural network. The at least one continuously differentiable model is specific to hardware of the neural network. The method also includes iteratively training the neural network using the at least one continuously differentiable model to provide at least one output for the neural network. Each iteration uses at least one output of a previous iteration and a current continuously differentiable model of the at least one continuously differentiable model.

Figure 2:
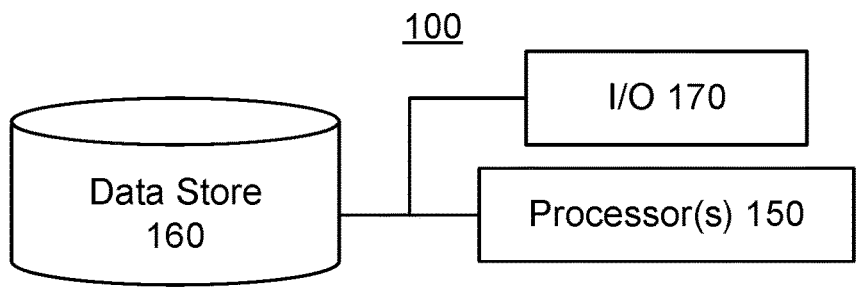
FIG. 2 is another block diagram of an exemplary embodiment of a system for training a neural network using a continuously differentiable model.

FIGS. 1 and 2 are block diagrams depicting an exemplary embodiment of a system 100 for training neural networks (NNs) such as deep learning NNs. For simplicity, only a portion of the system 100 is shown. The training system 100 is used in training the NN 120. Stated differently, the training system 100 performs training for and provides the training results (e.g. weights) to the NN 120. Although shown in FIG. 1, the NN 120 is not part of the training system 100 in at least some embodiments. Thus, the training system 100 may perform off-chip (otherwise termed off-line) training for the NN 120. Consequently, the NN 120 may be implemented as an inference only NN.

The training system 100 contains training data 130 and a training engine 110 that includes training algorithm(s) 114 and continuously differentiable models 112-1, 112-2 and 112-3 (collectively continuously differentiable models 112). Although three continuously differentiable models 112 are shown, fewer or more models might be used. The training system 100 also includes processor(s) 150, a data store 160, and input/output (I/O) device(s). The data store 160 may store components 112, 114 and 130. The processors 150 may execute the training algorithms 114 and continuously differentiable models 112.

The training system 100 utilizes one or more of the continuously differentiable models 112 in performing training for the NN 120. The continuously differentiable models 112 approximate the behavior of the NN 120. Thus, the differentiable models 112 take into account the hardware of the NN 120. For example, the NN 120 may be a binary network (−1 and 1 weights), ternary network (−1, 0 and 1 weights), two-bit weight network (−2, −1, 0, 1 and 2 weights) or other NN that uses discrete weights. In such embodiments, the continuously differentiable models 112 may approximate the transitions between the weights (e.g. step functions) while maintaining differentiability. This allows for the calculation of gradients during training. Similarly, the NN 120 may use discrete activations. The continuously differentiable models 112 may provide an approximation of the activations analogous to that provided for weights. Thus, the continuously differentiable models 112 more accurately represent the NN 120 while maintaining differentiability.

Conventional off-chip training does not use the continuously differentiable models 112 and may result in poorer inference accuracy for a NN 120. It is believed that the loss in accuracy for off-chip training occurs because the conventional training methods provide a poor approximation of the hardware for the NN 120. For example, a discrete NN (e.g. that uses discrete weights or activations) has vanishing gradients at all points. Standard backpropagation is not possible for such NNs. Conventional training systems (not shown) may thus use direct discretization of floating-point weights obtain to binary or ternary (i.e. discrete) weights. Such a method is subject to uncertainty in weights near the discretization boundaries. For the floating point-trained network, a small uncertainty in the weights is generally of little consequence because of partial cancellation of errors that occurs in the neuron. However, after discretization, the weights near the boundaries snap to one or the other side of the boundary. This can result in error amplification and may cause in a large loss of inference accuracy. Stated differently, inference accuracy may be dramatically reduced because the training was not performed with the knowledge that weights would be discretized or otherwise altered by hardware imperfections.

In contrast, the continuously differentiable models 112 provide an approximation of the behavior of the hardware for the NN 120 while maintaining calculable gradients. Through the use of the continuously differentiable models, the training system 100 is made aware of the hardware for the NN 120 for which training is performed. Because such models are differentiable, techniques such as back propagation that use gradients can be employed. The training may, therefore, take into account the discrete nature of the hardware for the NN 120 while employing accepted training techniques in the training algorithm 114. Thus, hardware-aware training may be provided by the training system 100 and inference accuracy of the NN 120 improved.

Figure 3:
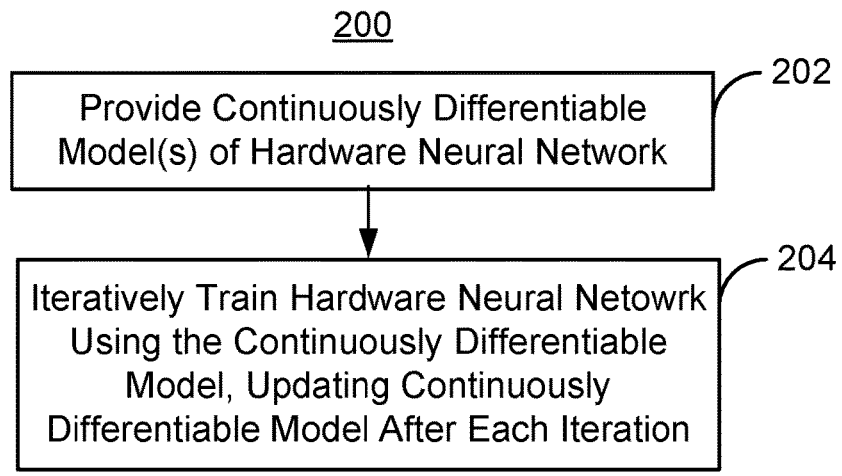
FIG. 3 is a flow chart depicting an exemplary embodiment of a method for training a neural network using a continuously differentiable model.

FIG. 3 is a flow chart depicting an exemplary embodiment of a method 200 for training a neural network using continuously differentiable model(s) of the neural network being trained. For simplicity, some steps may be omitted, performed in another order and/or combined. The method 200 is also described in the context of the training system 100 and NN 120. However, the method 200 may be used in connection with another training system and/or another NN.

One or more continuously differentiable models 112 are provided for the NN 120 to be trained, via step 202. The continuously differentiable model(s) 112 are specific to hardware of the neural network 120. In some embodiments, the continuously differentiable models 112 include a software model for floating-point weights and which does not take into account aspects of the hardware for the NN 120, such as discrete weights. Such a software model may be used for the first iteration (e.g. continuously differentiable model 112-1). However, subsequent iterations use other continuously differentiable model(s) 112 that provide closer approximations of the hardware (e.g. continuously differentiable models 112-2 and/or 112-3). Alternatively, all of the continuously differentiable models 112 approximate the hardware of the NN 120 being trained.

Iterative training for the NN 120 is performed using the continuously differentiable model(s) 112, via step 204. Each training iteration provides output(s) for the NN 120. Each iteration uses the output(s) of a previous iteration and a current continuously differentiable model to provide new outputs. As discussed above, in some embodiments, the first iteration is performed using a conventional floating-point/continuous model that does not incorporate discretization or other hardware aspects of the NN 120. Such an iteration provides a first approximation of the inputs (e.g. weights) for subsequent hardware-aware iterations. In another embodiments, all iterations use continuously differentiable models 112 that are hardware specific. In such embodiments, a first iteration may use inputs from a floating-point model or inputs obtained in another manner.

Iteratively training in step 204 may include performing back propagation using the output to obtain the weight(s) for each neuron. The weight so obtained is used in conjunction with the next continuously differentiable model 112 for a next iteration. Iterative training continues until the desired results are achieved. For example, training may terminate in response to weight(s) obtained from the current iteration being within a threshold from the weight(s) from a previous iteration.

For example, step 204 may use the continuously differentiable model 112-1, training data 130 and predetermined weights or activations for a first iteration. The output of the first iteration may undergo back propagation or other processing to obtain a second set of weights for the second iteration. The second iteration may use training data 130, the continuously differentiable model 112-2 and the second set of weights for training. The continuously differentiable model 112-2 may be a better approximately of the hardware for the NN 120 than the first continuously differentiable model 112-1. For example, transitions between discrete weights may be sharper. Based on the output of the second iteration, a third set of weights may be calculated. The third iteration may use training data 130, the continuously differentiable model 112-3 and the third set of weights for training. The continuously differentiable model 112-3 may be a better approximately of the hardware for the NN 120 than the second continuously differentiable model 112-2. This iterative training in step 204 may continue until some condition is reached. In some embodiments, the condition is that the new weights calculated are within a particular threshold of the previous weights. In such a case, not all of the continuously differentiable models 112 may be used because the weights may converge more quickly to a final value. In other embodiments, other conditions may be used. For example, it may be required that all available continuously differentiable models 112 are used. Once the training is completed, the results (e.g. weights) may be provided to the NN 120 for use.

Using the method 200, a significant improvement in the inference accuracy may be achieved for the NN 120. Because the continuously differentiable models 112 provide an approximation of the behavior of the hardware for the NN 120, the training system 100 is made aware of the hardware for the NN 120 for which training is performed. Because such models 112 are differentiable, techniques that use gradients can be employed during training. The training may take into account the discrete nature of the hardware for the NN 120 while employing accepted training techniques. Thus, inference accuracy of the NN 120 enhanced. Because off-chip training may be employed, the NN 120 may be smaller and more efficient. In some applications, only a small number of iterations need be employed. For example, acceptable accuracy may be achieved with only one or a few iterations. Thus, the benefits described herein may be achieved with a modest increase in the training CPU time.

Figure 4:
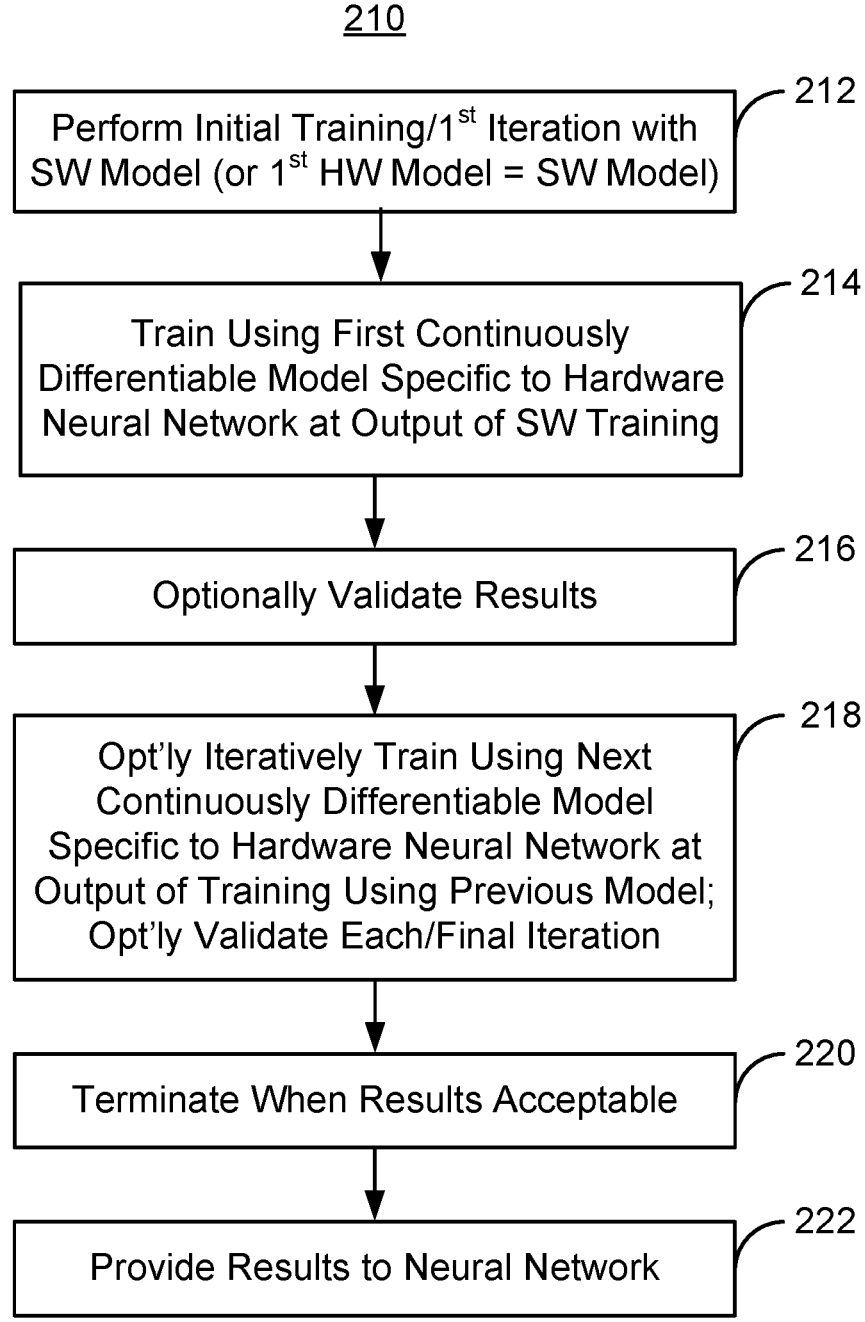
FIG. 4 is a flow chart depicting another exemplary embodiment of a method for training a neural network using a continuously differentiable model.

FIG. 4 is a flow chart depicting another exemplary embodiment of a method 210 for training a neural network using continuously differentiable model(s) of the neural network being trained. For simplicity, some steps may be omitted, performed in another order and/or combined. The method 210 is also described in the context of the training system 100 and NN 120. However, the method 210 may be used in connection with another training system and/or another NN.

One or more continuously differentiable models 112 are provided for the NN 120 to be trained, via step 212. Thus, step 212 is analogous to step 202. The continuously differentiable model(s) 112 are specific to hardware of the neural network 120. In some embodiments, the continuously differentiable models 112 include a software model that may be used for the first iteration. However, subsequent iterations use other continuously differentiable model(s) 112 that provide closer approximations of the hardware (e.g. continuously differentiable models 112-2 and/or 112-3). Alternatively, all of the continuously differentiable models 112 approximate the hardware of the NN 120 being trained.

For example, the continuously differentiable models 112 may be given by g(ω, X, a), where ω are the weights, X are the inputs from the training data 130 and b is a bias. In some embodiments, each continuously differentiable model, $g^n$, where n is the number of discrete levels, is given by:

$$g^n(\omega, \Delta, \omega_{sc}) = 2\Delta \sum_{k=-n}^{n} \left(\sigma(\omega - k\Delta, \omega_{sc}) - \frac{\varepsilon_n}{2}\right)$$

where ω is a weight, Δ is a discretization step for the at least one discrete weight, $\omega_{sc}$ is a transition scale between steps, $\varepsilon_n$ is an offset such that the each of the at least one continuously differentiable model passes through the origin, and σ is a scaled sigmoid. In some embodiments, the weight set is characterized by, the number of non-negative discrete weights in the set minus one (0 for binary, 1 for ternary, etc.). By decreasing the weight parameter $\omega_{sc}$, the weight function becomes an increasingly accurate approximation to the step function. The scaled sigmoid may be given by $$\sigma = 1/(1 + e^{-\omega/\omega_{sc}})$$

The above continuously differentiable models 112 may be used for discrete NNs. In another embodiment, other hardware models may be used to reflect other aspects of the NN 120. For example, if the NN 120 is a pruned, analog NN, the continuously differentiable model 112 may be given by $$g_{prune}(\omega, \Delta, \omega_{sc}) = 2\omega\Delta \cdot [\sigma(\omega, \Delta, \omega_{sc}) + \sigma(\omega, \Delta, -\omega_{sc})]$$

where (−Δ,Δ) defines a zero-window. The range of the allowable weights may also be set in step 212. This range may be selected so that that the initial value is equivalent to purely floating point-based training, while the final value is a good approximation to the hardware of the NN 120.

Training is performed such that a first continuously differentiable model 112-1 is incorporated, via step 214. For example, the standard activation for a software training method (e.g. training function 114) may be a=f(ωX+b), where f is the activation function, ω are the (floating point) weights, X are the inputs and b is the bias. An analog of this function that incorporates the continuously differentiable models may be used in the method 210. For the method 210, therefore, the activation may be given by the activation function using:

$$a = f(g^n(\omega, X, \alpha_i)X + b)$$

where $g^n$ is the continuously differentiable model 112 discussed above, a is realism parameter for the current continuously differentiable model, i is the iteration number and b is the bias. The bias, b, along with the weights may be iteratively determined. Thus, the bias for a next iteration may be determined using the current continuously differentiable model. Alternatively, the bias may be determined using another mechanism including a different (e.g. previous or final) continuously differentiable model different from the current continuously differentiable model.

For the first iteration in step 214, the standard (unmodified) activation a=f(ωX+b) may be used. In other embodiments, the output of the standard activation may be used to calculate the weights for the first iteration in step 214. For the method 210, it is assumed that the first iteration uses weights from the above activation as initial weights. Consequently, the first iteration in step 214 may use a=f(g(ω, X, α$_1$)X+b), where g(ω, X, α$_1$) is the continuously differentiable model 112-1. Step 214 may also include determining the weights, for example using back propagation or an analogous method that employs gradients. Because the continuously differentiable model 112-1 has a gradient, such methods can be used.

The results of the first iteration may optionally be validated, via step 216. Validation may include be performed using the weight determined in step 214 and the final continuously differentiable model 112-3. In some embodiments, a model of noise in the training process may also be applied as part of the validation step. In other embodiments other validation mechanisms might be used and/or validation may be performed at the end of the method 210.

Steps 214 and (optionally) 216 may be iteratively repeated, via step 218. In each iteration, the weights from the previous iteration are used and the next continuously differentiable model 112-2 and 112-3 are used. Each continuously differentiable model 112-2 and 112-3 may be a more accurate approximation of the hardware for the NN 120 than a previous continuously differentiable model 112-1 and 112-2, respectively. Thus, the second iteration may use the weights determined in the first iteration and a=f(g(ω, X, α$_2$)X+b), where g(ω, X, α$_2$) is the continuously differentiable model 112-2. The third iteration may use the weights determined in the second iteration and a=f(g(ω, X, α$_3$)X+b), where g(ω, X, α$_3$) is the continuously differentiable model 112-3.

Figure 5:
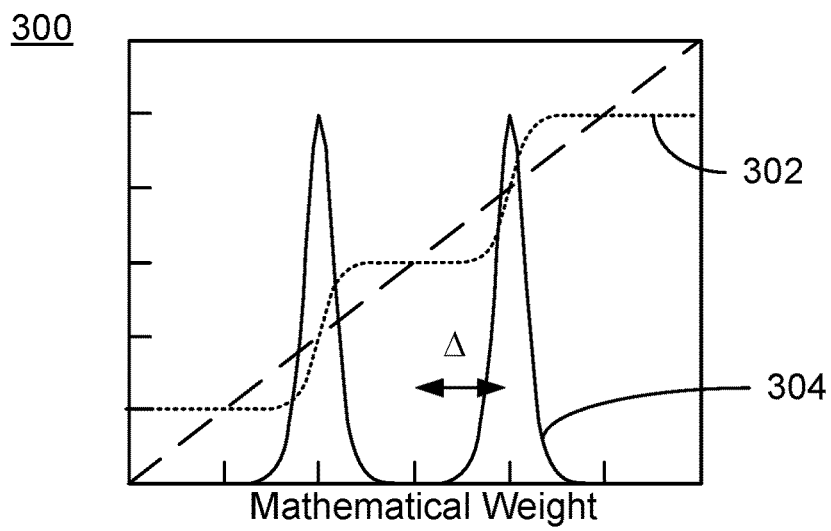
FIG. 5 is a graph depicting an exemplary embodiment of the continuously differentiable model.
Figure 6:
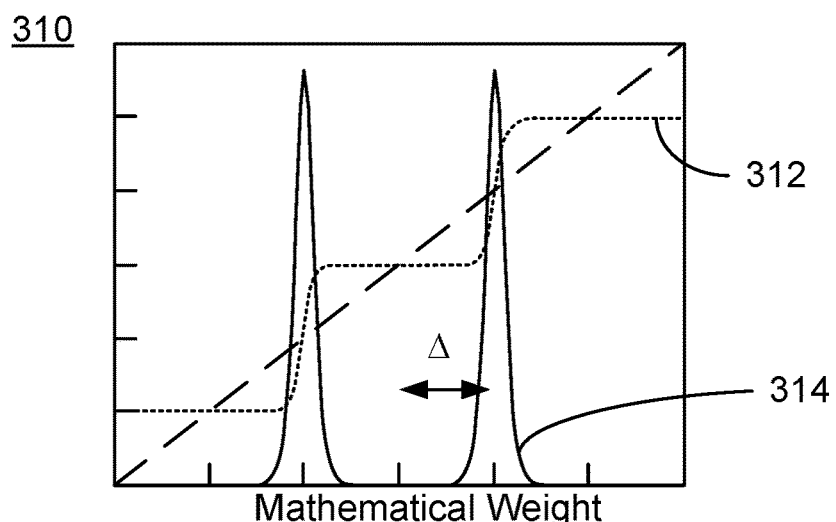
FIG. 6 is a graph depicting another exemplary embodiment of the continuously differentiable model.
Figure 7:
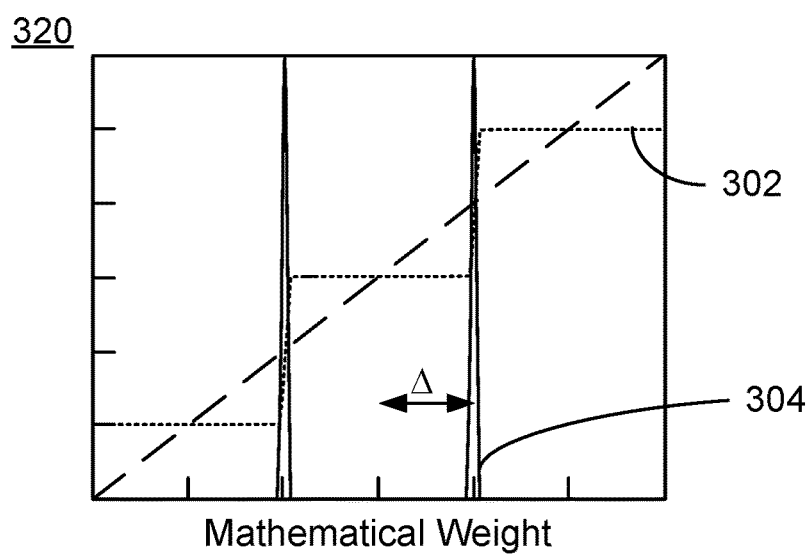
FIG. 7 is a graph depicting another exemplary embodiment of the continuously differentiable model.

For example, FIGS. 5, 6 and 7 are graphs 300, 310 and 320 depicting exemplary embodiments of the continuously differentiable models 112. Graphs 300, 310 and 320 are for explanatory purposes only and are not intended to be limiting or to depict particular results. Each graph 300, 310 and 320 includes a dashed line indicating real numbers. Graph 300 corresponds to model 112-1, graph 310 corresponds to model 112-2 and graph 320 corresponds to model 112-3. Dotted lines 302, 312 and 322 are the functions g(ω, X, α$_1$), g(ω, X, α$_2$) and g(ω, X, α$_3$) for continuously differentiable models 112-1, 112-2 and 112-3, respectively, of discrete weights. Thus, dotted lines 302, 312 and 322 are first, second and third approximations to discrete weights. Each model 112-1, 112-2 and 112-3 is continuously differentiable. This is shown by the solid lines 304, 314 and 324, which are the gradients for curves 302, 312 and 322, respectively. As can be seen in FIGS. 5-7, each model 112-1/302, 112-2/312 and 112-3/322 provides an improved approximately to the hardware of the NN 120, which utilizes discrete weights.

The training is terminated when acceptable results are achieved, via step 220. In some embodiments, this occurs when fewer iterations have been performed than there are continuously differentiable models 112. For example, for the system 100, one, two or three iterations may be performed, depending upon how rapidly acceptable results are achieved. In some embodiments, training is terminated when the weights determined in a particular iteration do not exceed threshold(s) from weights determined in a next previous iteration. In some such embodiments, training is terminated when the weights determined in a particular iteration are less than threshold(s) from weights determined in the next previous iteration. In other embodiments, other conditions for termination may be used.

Figure 8:
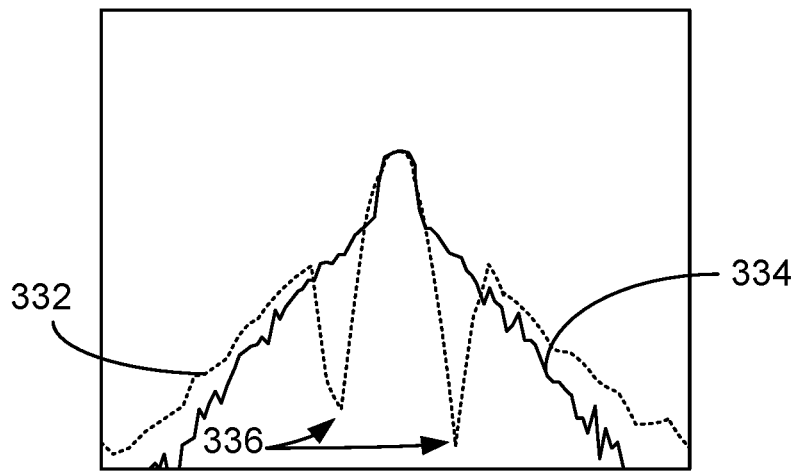
FIG. 8 is a graph depicting an exemplary embodiment of the weights calculated using continuously differentiable model.
Figure 9:
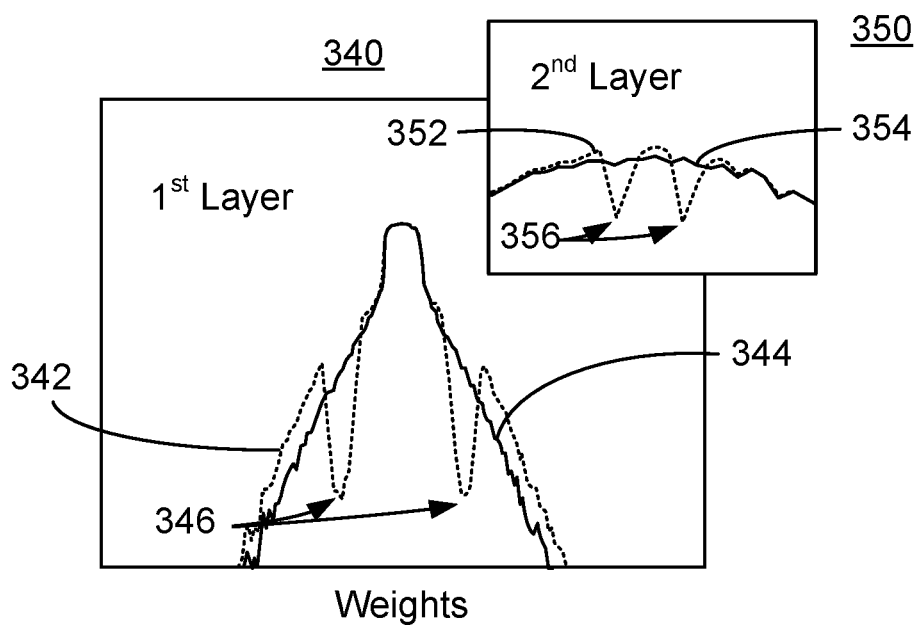
FIG. 9 is a graph depicting an exemplary embodiment of the weights calculated using continuously differentiable model.

Once acceptable weights have been determined, the results are provided to the NN 120, via step 222. Consequently, off-chip training for the NN 120 may be completed. For example, FIGS. 8 and 9 depicts graphs 330 and 340 and inset 350 indicating a difference between floating point modeling and training using the method 200. Graphs 330, 340 and 350 are for explanatory purposes only and not intended to represent a particular NN. In the graphs 330, 340 and 350, the dotted lines 332, 342 and 352 indicate the weights calculated using the method 210, while solid lines 334, 344 and 354 indicate weights calculated using conventional methods. Boundaries between the discrete values of the weights are indicated by minima 336, 346 and 356, respectively. As can be seen in FIGS. 8-9, use of the method allows the weights to stratify into their discrete values.

Using the method 210, a significant improvement in the inference accuracy may be achieved for the NN 120. Because the continuously differentiable models 112 provide an approximation of the behavior of the hardware for the NN 120, the training system 100 is made aware of the hardware for the NN 120 for which training is performed. For example, the training takes incorporates the discrete nature of the weights used in the NN 120. Because such models 112 are differentiable, techniques that use gradients can be employed. Thus, inference accuracy of the NN 120 enhanced. Because off-chip training may be employed, the NN 120 may be smaller and more efficient. In some applications, only a small number of iterations need be employed.

Thus, using the methods 200 and 210 hardware aware training may be performed for the NN 120. As a result, improved inference accuracy may be achieved. The method and system have been described in accordance with the exemplary embodiments shown, and one of ordinary skill in the art will readily recognize that there could be variations to the embodiments, and any variations would be within the spirit and scope of the method and system. Accordingly, many modifications may be made by one of ordinary skill in the art without departing from the spirit and scope of the appended claims.

We claim:

1. A method for training a neural network comprising:
   providing at least one continuously differentiable model of the neural network, the at least one continuously differentiable model being specific to hardware of the neural network;
   iteratively training the neural network using the at least one continuously differentiable model to provide at least one output for the neural network, each iteration using at least one output of a previous iteration and a current continuously differentiable model of the at least one continuously differentiable model,
   wherein an activation function for the iteratively training step is a function of the current continuously differentiable model and a bias, wherein the bias is determined each iteration and the current continuously differentiable model used in the activation function is different for each iteration
   wherein the at least one continuously differentiable model is given by $$g_{prune}(\omega,\Delta,\omega_{sc})=2\omega\Delta\cdot[\sigma(\omega,\Delta,\omega_{sc})+\sigma(\omega,\Delta,-\omega_{sc})]$$

where ω is a weight, (−Δ,Δ) defines a zero-window, $\omega_{sc}$ is a transition scale between steps, and σ is a scaled sigmoid.

2. The method of claim 1 wherein a first continuously differentiable model of the at least one continuously differentiable model is a software model.

3. The method of claim 1 wherein each current continuously differentiable model of the neural network provides a closer approximation to the hardware of the neural network than a previous continuously differentiable model.

4. The method of claim 1 wherein the iteratively training further includes:
performing back propagation using the at least one output to obtain at least one weight, the at least one weight being used for a next iteration.

5. The method of claim 4 wherein the step of iteratively training further includes:
terminating if the at least one weight is not more than at least one threshold different from at least one previous weight.

6. The method of claim 4 wherein the continuously differentiable model is based on at least one weight and the at least one input for the training step.

7. The method of claim 6 wherein an activation function for the iteratively training step is a function of the at least one input, and a realism parameter for the current continuously differentiable model.

8. The method of claim 1 wherein the iteratively training step further includes:
determining the at least one bias is determined using the current continuously differentiable model.

9. The method of claim 1 wherein the iteratively training step further includes:
determining the at least one bias is determined using at least one other continuously differentiable model different from the current continuously differentiable model.

10. The method of claim 6 wherein the neural network utilizes at least one discrete weight.

11. The method of claim 4 wherein the iteratively training step further includes:
validating the at least one weight using a final continuously differentiable model of the at least one continuously differentiable model after each iteration.

12. The method of claim 11 wherein the validating step includes applying a process noise model.

13. The method of claim 4 wherein the iteratively training step further includes applying the current continuously differentiable model to at least one activation and the at least one weight.

14. The method of claim 1 wherein the iteratively training step occurs on a chip separate from for the neural network, the method further comprising:
providing at least one final output to the neural network.

15. A method for training a neural network comprising:
providing at least one continuously differentiable model of the neural network, the at least one continuously differentiable model being specific to hardware of the neural network;
iteratively training the neural network using the at least one continuously differentiable model to provide at least one output for the neural network, each iteration using at least one output of a previous iteration and a current continuously differentiable model of the at least one continuously differentiable model,
wherein an activation function for the iteratively training step is a function of the current continuously differentiable model and a bias, wherein the bias is determined each iteration and the current continuously differentiable model used in the activation function is different for each iteration
wherein the iteratively training step further includes:
determining the at least one bias is determined using the current continuously differentiable model
wherein each of the at least one continuously differentiable model, $g^n$, is given by:

$$g^n(\omega, \Delta, \omega_{sc}) = 2\Delta \sum_{k=-n}^{n} \left(\sigma(\omega - k\Delta, \omega_{sc}) - \frac{\varepsilon_n}{2}\right)$$

where $\omega$ is a weight, $\Delta$ is a discretization step for the at least one discrete weight, $\omega_{sc}$, is a transition scale between steps, $\varepsilon_n$ is an offset such that the each of the at least one continuously differentiable model passes through the origin, and $\sigma$ is a scaled sigmoid.

16. The method of claim 15 wherein the scaled sigmoid is given by $\sigma = 1/(1+e^{-\omega/\omega_{sc}})$.

17. A method for training a neural network comprising:
providing at least one continuously differentiable model of the neural network, the at least one continuously differentiable model being specific to hardware of the neural network, the neural network using a plurality of discrete weights;
iteratively training the neural network using the at least one continuously differentiable model to provide at least one output for the neural network, each iteration using at least one output of a previous iteration and a current continuously differentiable model of the at least one continuously differentiable model, the current continuously differentiable model providing a closer approximation to the hardware of the neural network than a previous continuously differentiable model of the at least one continuously differentiable model, the iteratively training step further including
using a software model for the neural network as a first continuously differentiable model in a first iteration;
performing back propagation using at least one output of each iteration to obtain at least one weight for each iteration;
for each iteration, applying to the at least one weight from a previous iteration a function (f) of the current continuously differentiable model multiplied by at least one input and added to a bias $f(g(\omega, X, \alpha)X+b)$, where g is the current continuously differentiable model, $\omega$ is the at least one weight for the current iteration, X is the at least one input and b is a bias, $\alpha$ is a realism parameter indicating the closeness to the hardware of the neural network and wherein the current continuously differentiable model is $$g^n(\omega, \Delta, \omega_{sc}) = 2\Delta \sum_{k=-n}^{n} \left(\sigma(\omega - k\Delta, \omega_{sc}) - \frac{\varepsilon_n}{2}\right)$$

where $\omega$ is a weight, $\Delta$ is a discretization step for the at least one discrete weight, $\omega_{sc}$ is a transition scale between steps, $\varepsilon_n$ is an offset such that the continuously differentiable model passes through the origin, and $\sigma$ is $1/(1+)e^{-\omega/\omega_{sc}}$); and
terminating the iteratively training step if the at least one weight is not more than at least one threshold different from at least one previous weight.

18. A neural network training system implemented using at least one computing device, the at least one computing device including at least one processor and memory, the training system comprising:
- at least one continuously differentiable model of the neural network, each of the continuously differentiable model being specific to hardware of the neural network;
- a training subsystem iteratively using the at least one continuously differentiable model of the neural network and at least one input, the training subsystem configured such that each iteration uses at least one output of a previous iteration and a current continuously differentiable model of the at least one continuously differentiable model closer to the hardware of the neural network than a previous continuously differentiable model of the at least one continuously differentiable model, wherein an activation function for the iteratively training step is a function of the current continuously differentiable model and a bias, wherein the bias is determined each iteration and the current continuously differentiable model used in the activation function is different for each iteration
- wherein the continuously differentiable model, $g^n$, is given by:

$$g^n(\omega, \Delta, \omega_{sc}) = 2\Delta \sum_{k=-n}^{n} \left(\sigma(\omega - k\Delta, \omega_{sc}) - \frac{\varepsilon_n}{2}\right)$$

where $\omega$ is a weight, $\Delta$ is a discretization step for the at least one discrete weight, $\omega_{sc}$ is a transition scale between steps, $\varepsilon_n$, is an offset such that the continuously differentiable model passes through the origin, and $\sigma$ is a scaled sigmoid given by $\sigma = 1/(1+e^{-\omega/\omega_{sc}})$ and n is an iteration number.

* * * * *